(12) United States Patent
Wendling et al.

(10) Patent No.: US 11,025,353 B2
(45) Date of Patent: Jun. 1, 2021

(54) AUTHENTICATION OF DIGITAL BROADCAST DATA

(71) Applicant: Nagravision S.A., Cheseaux-sur-Lausanne (CH)

(72) Inventors: Bertrand Wendling, Cheseaux-sur-Lausanne (CH); Jean-Philippe Aumasson, Cheseaux-sur-Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 15/742,653

(22) PCT Filed: Jul. 13, 2016

(86) PCT No.: PCT/EP2016/066618
§ 371 (c)(1),
(2) Date: Jan. 8, 2018

(87) PCT Pub. No.: WO2017/009370
PCT Pub. Date: Jan. 19, 2017

(65) Prior Publication Data
US 2018/0205475 A1    Jul. 19, 2018

(30) Foreign Application Priority Data

Jul. 13, 2015 (GB) .................................. 1512232

(51) Int. Cl.
*H04H 60/23* (2008.01)
*H04N 21/266* (2011.01)
(Continued)

(52) U.S. Cl.
CPC ............. *H04H 60/23* (2013.01); *G06F 21/10* (2013.01); *H04N 21/26613* (2013.01);
(Continued)

(58) Field of Classification Search
CPC ......... H04N 21/2541; H04N 21/26613; H04N 21/4627; H04N 21/63345; H04H 60/23; G06F 21/10
See application file for complete search history.

(56) References Cited

U.S. PATENT DOCUMENTS 6,393,562 B1   5/2002 Maillard
6,760,752 B1 * 7/2004 Liu ..................... H04L 63/0428
(Continued)

FOREIGN PATENT DOCUMENTS

EP    1768408 A1    3/2007
WO    2015/083315 A1    6/2015

OTHER PUBLICATIONS

HbbTV Association, "HbbTV2.0 Specification", May 1, 2015 (Year: 2015).*

(Continued)

*Primary Examiner* — Nicholas T Corbo
(74) *Attorney, Agent, or Firm* — Oblon, McClelland, Maier & Neustadt, L.L.P.

(57) ABSTRACT

A broadcast receiving system is disclosed that verifies a current digital certificate extracted from a digital broadcast signal using a previous digital certificate previously stored as trusted. The current and previous digital certificates are associated with digital signatures with which data received with the broadcast signal has been signed. Also disclosed is a system for signing application data to be broadcast together with a digital certificate in a digital broadcast signal. A current digital certificate attesting the validity of a digital signature attached to broadcast data is in turn signed with a digital signature using one or more previous private keys associated with respective previous certificates identifying the issuer of the current digital certificate. These disclosures are in particular applicable to HbbTV.

22 Claims, 6 Drawing Sheets

(51) Int. Cl.
*H04N 21/6334* (2011.01)
*G06F 21/10* (2013.01)
*H04N 21/254* (2011.01)
*H04N 21/4627* (2011.01)

(52) U.S. Cl.
CPC ... *H04N 21/63345* (2013.01); *H04N 21/2541* (2013.01); *H04N 21/4627* (2013.01)

(56) References Cited

U.S. PATENT DOCUMENTS

| | | | | |
|---|---|---|---|---|
| 7,574,607 B1* | 8/2009 | Liu | ............... | H04L 9/3247 |
| | | | | 713/156 |
| 2006/0095388 A1* | 5/2006 | Brown | ............... | H04L 63/0823 |
| | | | | 705/67 |
| 2007/0180464 A1* | 8/2007 | Dellow | ............... | H04N 7/1675 |
| | | | | 725/31 |
| 2014/0089660 A1* | 3/2014 | Sarangshar | ............. | H04L 9/321 |
| | | | | 713/156 |
| 2014/0359281 A1* | 12/2014 | Saboori | ............... | H04L 63/0823 |
| | | | | 713/156 |
| 2016/0219347 A1* | 7/2016 | Kitahara | ......... | H04N 21/23617 |

OTHER PUBLICATIONS

International Search Report for PCT/EP2016/066618, dated Oct. 7, 2016, in 3 pages.
HBBTV. "HbbTV 2.0 Specification." May 1, 2015. Retrieved from <https://www.hbbtv.org/wp-content/uploads/2015/07/HbbTV_specification_2_0.pdf>. Last accessed Jan. 8, 2018.
Information Technology Laboratory. "Digital Signature Standard (DSS)." FIPS PUB 186-4. National Institute of Standards and Technology. Jul. 2013. Retrieved from <http://nvl.pubs.nist.gov/nistpubs/FIPS/NIST.FIPS.186-4.pdf>. Last accessed Jan. 8, 2018.
Cooper. "Internet X.509 Public Key Infrastructure Certificate and Certificate Revocation List (CRL) Profile." Network Working Group, Proposed Standard. May 2008.

* cited by examiner

AUTHENTICATION OF DIGITAL BROADCAST DATA

The current disclosure relates to the verification data broadcast in a digital broadcast signal, in particular although not exclusively in a digital television signal, yet more particularly in the context of HbbTV.

BACKGROUND

Figure 1:
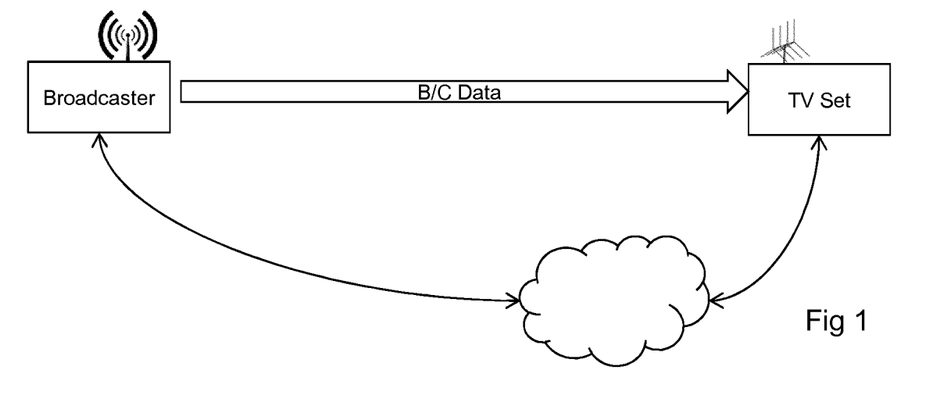
FIG. 1 illustrates an interactive television system comprising a broadcaster and an illustrative TV set as a receiver.

Modern interactive television systems, such as those implementing the HbbTV standard, provide for interactive applications to run on a user terminal such as a television set or set-top box. In particular, according to the HbbTV standard, a hybrid approach is followed by which application data may be received in a broadcast signal, over-the-air, by satellite or by cable. The application data can include an Internet link or universal resource locator (URL) to a location from where the interactive application, or content for a local interactive application, can be downloaded by the user terminal over the Internet. This is illustrated in FIG. 1. For example in an HbbTV system, the application data is provided in the form of Digital Video Broadcast (DVB) standard formatted tables typically referred to as Application Information Table (AIT). The application data can comprise a URL as mentioned above, other data for use by an application and/or a data or object carousel for downloading application data or the application itself from the broadcast signal. In the systems discussed above, the data (for example the tables) are broadcast in clear text.

Figure 2:
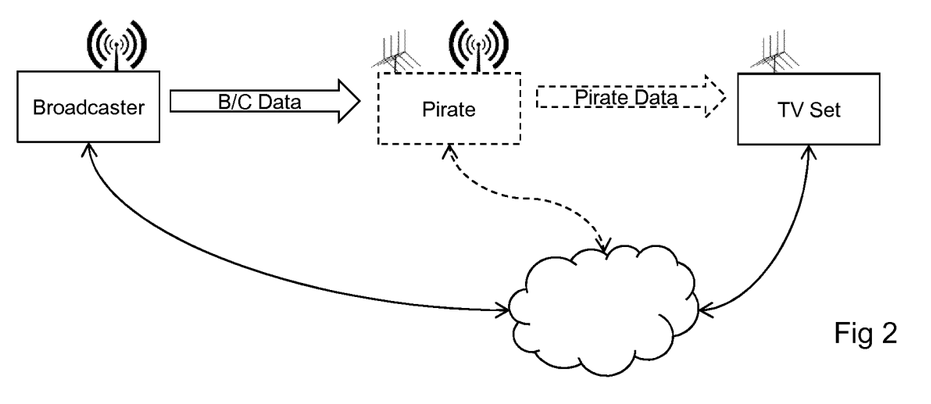
FIG. 2 illustrates a man in the middle attack on the interactive television system.

In particular given the transmission of the application data in clear text, there is a risk of a form of man-in-the-middle attack, whereby a pirate intercepts the broadcast signal and manipulates the application data before sending it on. The application data may be manipulated in such a way as to direct an application resident on a TV set to access fraudulent information, for example causing a user to divulge confidential information to the pirate, or to download an application from a pirate URL, for example to install a virus on the TV set. The manipulated application data is then sent on or broadcast by the pirate with a view to carrying out a fraud when the TV set or its user acts on the information. This is illustrated in FIG. 2.

To increase the security of interactive TV systems, it would be desirable to broadcast application data in such a way so as to guard against man-in-the-middle attacks of the kind described above.

SUMMARY

In overview, disclosed embodiments relate to authentication of digitally broadcast application data by digitally signing the application data. A certificate associated with a private key used by the issuer of the certificate to digitally sign the application data can be used by a TV set or other user terminal to verify the digital signature. Embodiments are disclosed regarding how to verify and build trust in the certificate, both initially and a new certificate is issued by the issuer. Without mechanisms to verify trust in the certificate, in particular when a certificate changes, the system would still be vulnerable to a man-in-the-middle attack in which the pirate replaces the issuers certificate with a pirate certificate.

It will be appreciated that the issuer of the certificate (the owner of the corresponding private key) may be a natural person or a legal entity such as a broadcaster. However, as used herein, the term "issuer" may reference a particular application, service, broadcast channel or program for which application data may be independently signed. Likewise, reference to an issuer would also encompass reference to, for example, a consortium of broadcasters having agreed to use the same certificate. The term "owner", for example owner of a private key, will be understood accordingly. Further, it will be appreciated that the current disclosure is equally applicable to broadcast data other than application data, for example screen overlay data inviting a user to call a donation helpline, although much of the current disclosure is made in terms of application data by way of example and for the sake of clarity and simplicity.

The term "certificate" is understood to mean a public key (paired with an associated private key used by the issuer to sign data) together with at least one digital signature applied to the public key. A certificate can be provided according to various formats and standards, for example the X.509 standard. A digital signature of a message (here typically an item of data or a public key) is generated by applying a private key of a key pair to the message or a hash digest of the message using a signature algorithm, many examples of which are well known in the art. A digital signature of a message can be verified by a signature verification algorithm (corresponding to the signature algorithm) using a public key of the key pair to verify correspondence between the signature and the message or its hash digest. Reference to verifying data using a certificate will be understood to comprise verifying a digital signature of the data using a public key associated with the certificate.

Reference to signing a new certificate with a specific private key will be understood as reference to signing of at least a public key associated with the new certificate with the specific private key (although the signature may be generate by signing other data together with the public key, for example issuer information or information relating to an external certification authority). The term "signature" will be understood accordingly in this context. Where the specific private key is associated with an existing certificate, this signature process may also be referred to as issuing the new certificate using the existing certificate. Reference to verifying a first certificate using a second certificate will be understood to mean authenticating or verifying the public key of the first certificate with the public key of the second certificate by applying the public key of the second certificate to a signature in the first certificate of at least the public key of the first certificate (although the signature may in some case be generated for the public key of the first certificate together with some other data, for example issuer information or information relating to an external certification authority).

In the present disclosure "verifying", "validating" or "authenticating" data or a certificate using a certificate is to be read as shorthand for a process of verifying a digital signature associate with or attached to the data or certificate by processing the digital signature using a public key associated with the certificate in a signature verification algorithm. Similarly, verifying, validating or authenticating a digital signature (of data, a certificate, or otherwise) is to be read in an analogous manner. The skilled person in the field of digital signatures and digital certificates, more generally in the field of authentication of digital data or documents, or even more generally in the fields of data security and cryptography is familiar with the terms above, as well as was the terms "public key" and "private key" in relation to asymmetric cryptography.

In a first aspect, there is provided a broadcast receiving system comprising a receiver for receiving a digital broadcast signal and a processor. The processor is configured to verify a current digital certificate extracted from a digital broadcast signal using a previous digital certificate previously stored as trusted. The current and previous digital certificates are associated with digital signatures with which data received with the broadcast signal has been signed. The current digital certificate has been signed with a private key associated with a previous certificate.

By signing a current certificate with a private key associated with a previous certificate, when the current certificate is issued, trust built up in the previous certificate can be transferred to the current certificate by verifying the current certificate using the previous certificate (as long as at least one of the previous certificates stored as trusted by the system is part of a set of previous certificates with which the current certificate has been signed). In this way, the period required to trust a new certificate following a change of certificate is reduced or eliminated and the risk of a man-in-the-middle attack using a pirate certificate is reduced or even eliminated as a consequence.

Further, in accordance with embodiment, trust can be built and maintained without the need for certificates or cryptographic keys being preloaded in the system at the manufacturing stage to be used to authenticate data received by the user device. Thus, there may be no need for a global certification authority providing trust in the certificates to enable authentication of received data.

In some embodiments, the processor is configured to:
extract the current digital certificate from the broadcast signal;
make a first determination if the extracted digital certificate has previously been stored as trusted;
if the first determination is negative, make a second determination if a previous digital certificate from the same issuer has been stored as trusted;
if the second determination is positive, use the stored previous digital certificate to make a third determination if the extracted certificate is valid by verifying the extracted digital certificate using a respective public key associated with the stored as trusted previous digital certificate; and
if the third determination is positive, store the extracted digital certificate as trusted.

The processor is, in some embodiments, further configured to:
extract the data from the broadcast signal;
if the first determination is positive, use the public key associated with the extracted digital certificate to verify the digital signature of the data; and,
if the third determination is positive, use the public key associated with the extracted digital certificate to verify the digital signature of the data.

The data may be signed using a private key and the current digital certificate may be associated with the private key to identify an owner of the private key (issuer of the certificate) and with a public key for verifying the digital signature. The current digital certificate may have been issued using one or more private keys associated with respective previous digital certificates issued by the issuer, which may comprise digitally signing the associated public key separately with each of the one or more private keys.

The data may be extracted in response to a request from a user or another trigger, or data may be extracted periodically in order to be cached in the system, for example a memory of a television set or set-top box. Where the current certificate has already been stored, the extracted certificate may be used either by using it directly or using the stored version of it, of course.

The processor may be configured to make a positive third determination if a public key associated with any one of a plurality of previous digital certificates that have been stored as trusted correctly verifies the current digital signature. If the system has been off-line for some time, for example because the user has been on holiday, it may have missed out on an intermediate change of certificate. By enabling authentication using any one of a number of previous certificates, trust built up in previous certificates need not be lost in such cases, as long as one of the previous certificates stored as trusted has been used to sign the current certificate. To this end, the current digital certificate may have been digitally signed with a plurality of private keys associated with respective previous certificates to create respective digital signatures (which may collectively be referred to as a signature), such that the digital signature (i.e. each respective signature) can be verified with any one of a plurality of respective public keys associated with the respective previous certificates. For example, the current digital certificate may be associated with a plurality of digital signatures, each associated with a respective previous certificate, so that if any one of these previous certificates is used for authentication of the current certificate, one of the digital signatures will validate/decrypt correctly and the current certificate will be recognised as a trusted one.

In some embodiments, if the second determination is negative and no certificate from the same issuer has been extracted by the system previously (or more generally whenever a certificate is extracted for an issuer for the first time, for example independent of any other determination), the extracted certificate may be stored as trusted. This provides a way of initially trusting a certificate either in a start-up mode of the system when there are no previous trusted certificates in the system, or when a certificate for a new issuer (broadcaster, channel, service, . . . ) is extracted for the first time. For a man-in-the-middle attack to be successful in these circumstances, it would have to be timed precisely with the moment of first extraction of the certificate, the probability of which is expected to be low in most circumstances.

The system may be configured to generate a certificate warning signal, which could result in display of a warning, blocking of application data, other contents or their use, or other actions responsive to the warning. A certificate warning may be generated if the second determination is negative, for example.

The system may be configured to periodically extract the current certificate from the broadcast signal and store the extracted certificate as trusted if it has been extracted consistently for a predetermined number of times and/or a predetermined amount of time. Consistency may be measured by any suitable criteria, for example that each extracted certificate is identical to the previously extracted one. In this way, trust in the certificate can be built up if it is consistently received in the broadcast signal over an extended period of time, for example a day, a few days, a week, weeks, a month or several months. However, it can be noted that, as long as a previous trusted certificate that is also used for signing the current certificate is stored by the system, it will not be necessary to follow this extended trust building operation when a change of certificate occurs.

The system may implement an HbbTV interactive environment and/or may comprise a television receiver. It will, however, be appreciated that the present disclosure is not limited to digital television systems but is equally applicable to other kinds of digital broadcast systems, which may be susceptible to a man-in-the-middle attack.

In a second aspect, there is provided a system for signing data to be broadcast in conjunction with a digital certificate in a digital broadcast signal, for example a digital television signal. The system comprises a processor configured to sign data to be broadcast with a digital signature using a private key, wherein the digital certificate is associated with the private key owned by an owner of the private key (the issuer of the certificate) and with a public key for verifying the digital signature. The processor is further configured to sign the digital certificate with a digital signature using one or more previous private keys associated with respective previous certificates from the issuer. As explained above, by issuing a current certificate using one or more previous certificates from the same issuer, receiving terminals such as TV sets or set-top boxes can transfer trust they have in previous certificates to the current certificate without the need for an extended period to build up trust again, which could represent an opportunity for a man-in-the-middle attack introducing a pirate certificate.

In a third aspect there is provided a broadcasting system for broadcasting signed application data and comprising a system for signing application data as set out above and a transmitter for transmitting a digital broadcast signal comprising the signed data and digital certificate.

It will, of course, be understood that the signed data and digital certificate may be broadcast together substantially at the same time, for example in the same or parallel data streams. Alternatively, the signed data and digital certificate may be broadcast independently, at different times and/or different intervals. Where needed for pairing the signature and certificate, an identifier, for example identifying the issuer of the certificate, may be associated with both so that the certificate can be used to verify the correct signature. Alternatively, the receiving system may use other means to match up certificate with signatures, for example the certificate may be attached to or transmitted together with the signature and signed data.

As mentioned above, the data may comprise application data for use by an application or for loading the application itself. The application data may comprise a URL or other contact information for use by the application or to launch the application. The data may be broadcast in the form of a DVB table and/or may comprise data in the form of an object or data carousel; data required to run or start an application in the form of an object or data carousel; or a table comprising an URL with a link to a location where to find a related application. The data may be in the form of a DVB AIT (Application Information Table) and/or may comprise one or more of: audio data; video data; subtitles; screen overlay data and content related to broadcast or on demand audio and video data.

In further aspects, there are provided methods as implemented by the processor(s) above, as well as computer program products comprising coded instructions implementing such respective methods, when run on a computer, and one or more computer readable media carrying each such computer program product. Further aspects extend to systems comprising means for implementing the steps of such methods.

BRIEF DESCRIPTION OF THE DRAWING

Embodiments will now be described, by way of example and illustration, with reference to the accompanying drawings, in which.

DETAILED DESCRIPTION

Figure 3:
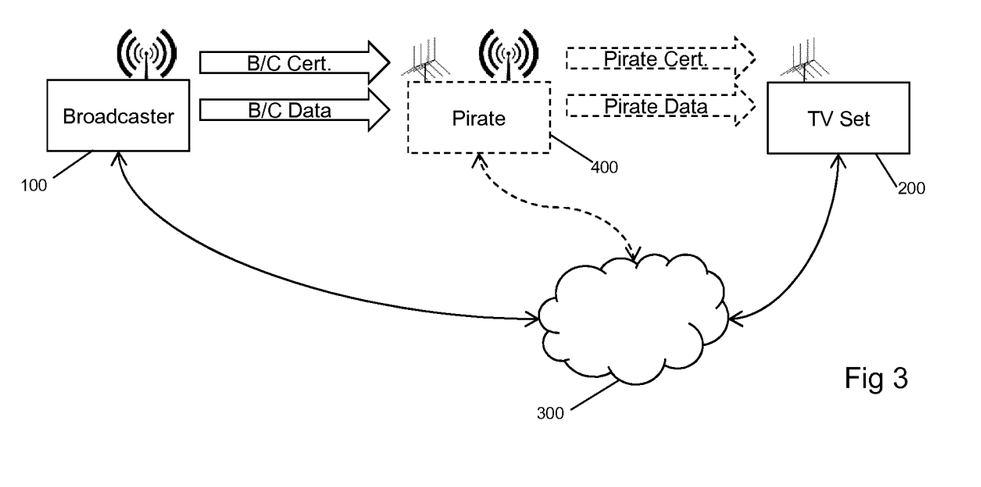
FIG. 3 illustrates an interactive television comprising digitally signed data and a man-in-the-middle attack on such a system.

With reference to FIG. 3, a broadcaster 100 transmits, together with audio-visual data and television channels, data such as application data and certificates with which respective items of data have been signed, as explained in detail below. Mostly, the description is made in terms of a current certificate, which is the current certificate for a given issuer (owner of a corresponding private key). It will be understood that in practice a broadcaster may transmit a number of current certificates for respective issuers (as defined above). It will be understood that certificates are processed separately for each issuer and that the description below is mostly made in terms of a single current certificate for the sake of clarity and simplicity of presentation.

A receiver 200, in some embodiments a television set or set-top box, receives the broadcast signal and extracts data and certificates from the broadcast signal. Data and certificates are, depending on the embodiment, extracted in response to a trigger event such as a user input, or periodically so that they are cached and ready for use in the receiver 200, or both. The data may include overlay data to overlay on received audio-visual data, or application data such as HTML pages with embedded applications or URLs for use by applications loaded in the receiver 200 to access information over the Internet (or other communications network) 300, or to launch an application, for example using a URL. The receiver 200 authenticates the extracted data using extracted or stored certificates and also verifies trust in the certificates used for authentication, as described in detail below.

A pirate 400 carrying out a man-in-the-middle attack is illustrated in dashed lines in FIG. 3. The pirate 400 receives the broadcast data and certificate and transmits a pirate certificate and manipulated data signed with the pirate certificate to the receiver 200. For example, the data may comprise a URL for a malware application to replace an application provided by the broadcaster. If the attacker successful, the receiver 200 would authenticate the pirate data using the pirate certificate and then access the malware application over the Internet 300 instead of the broadcaster's application. To guard against this type of attack, the broadcaster 100 has digitally signed the current certificate with one or more previous certificates that may be trusted by the receiver 200 and, correspondingly, the receiver 200 uses previously trusted certificates to validate the current certificate, for example to distinguish a change by the broadcaster 100 to a new certificate from a changed certificate due to a man-in-the-middle attack. This will be described in detail below.

Figure 4:
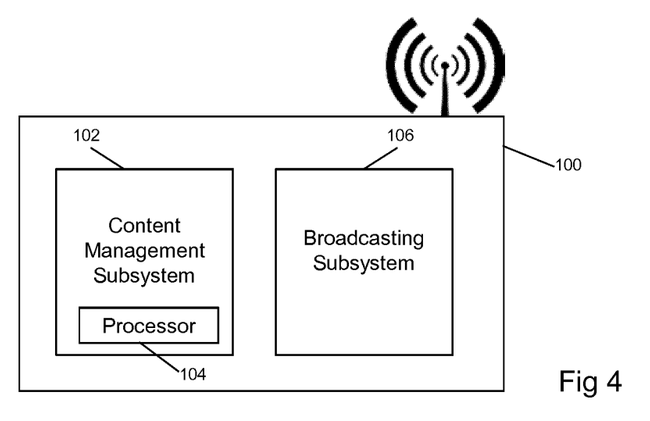
FIG. 4 illustrates a broadcaster in the interactive television system.

With reference to FIG. 4, the broadcaster 100 comprises a content management subsystem 102 including a processor 104 and a broadcasting subsystem 106. The content management subsystem 102 is configured to prepare content and data for broadcasting by the broadcasting subsystem 106 including digitally signing the data and the certificate used for signing the data, as described in detail below. It will be appreciated that the broadcaster 100, content management subsystem 102 and broadcasting subsystem 106 will in practice include many more components including server client arrangements, memory banks, network interfaces, user interfaces to allow user intervention, signal conditioners, multiplexers, broadcasting equipment, etc., the details and function of which will be well known to a person skilled in the art and which are omitted from the present discussion for the sake of clarity of presentation. For example, a typical architecture may involve a head end infrastructure connected to a variety of data servers and providing signals for broadcast by a suitable transmission medium such as over-the-air, satellite or cable.

In some embodiments, the broadcaster 100 may be arranged to broadcast signals and make data and other applications available over the Internet 300 by implementing a HbbTV standard, for example HbbTV 1.5 or 2.0 (see for example HbbTV 2.0 Specification, 01-05-2015, available online at ≤www.hbbtv.org/pages/about_hbbtv/HbbTV_specification_2_0.pdf≥, incorporated herein by reference in its entirety). In some such embodiments, application data such as application URLs, object or data carousels are broadcast in the form of DVB AIT formats.

In some embodiments, the content management subsystem 102, specifically the processor 104, is configured to digitally sign application data and create certificates with a public key for verification of signatures created with a corresponding private key in accordance with, for example, the FIPS standard 186-4 (see ≤nylpubs.nist.gov/nistpubs/FIPS/NIST.FIPS.186-4.pdf≥, incorporated herein by reference in its entirety). Certificates are generated and formatted, in some embodiments, in accordance with the X.509 standard, as specified in RFC5280 (available online at ≤tools.ietf.org/html/rfc5280≥). incorporated herein by reference in its entirety. In some embodiments, digital signatures are created using DSA or ECDSA algorithms (see ≤nylpubs.nist.gov/nistpubs/FIPS/NIST.FIPS.186-4.pdf≥, incorporated herein by reference in its entirety).

Figure 5:
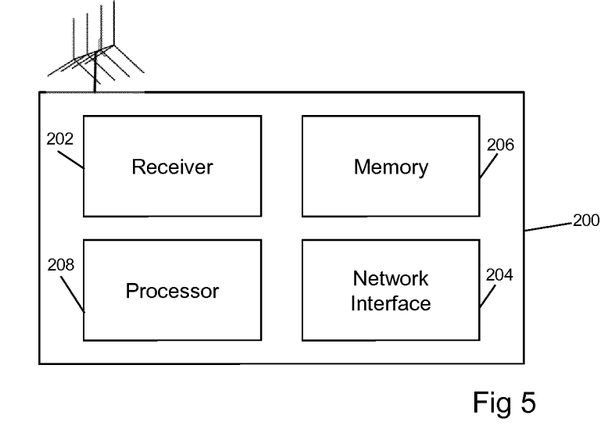
FIG. 5 illustrates a receiver in the interactive television system.

With reference to FIG. 5, the receiver 200, for example a TV set of set top box, comprises a receiver portion 202 for receiving the broadcast signal, decoding and de-multiplexing the broadcast signal and extract various data and audio/video streams from the broadcast signal, as will be well familiar to the person skilled in the art. The receiver may be configured for receiving broadcast signals over-the-air, from one or more satellites or over cable. The receiver 200 further comprises a network interface 204 for interfacing with the internet, a wide area network and/or a local area network, for example via a wired, Wi-Fi, Bluetooth, or other connection. The receiver, in some embodiments, implements a hybrid approach, for example implementing the HbbTV standard, with audio/data and other data received from both a broad cast signal and over a network such as the Internet. A memory 206 stores data (audio/video data and related data such as screen overlays, subtitles, different audio streams, application data, user data, etc.) received via the broadcast signal or network connection and processed data. A processor 208 processes received data streams to extract and process data, audio/video, application or other data, and stores data in the memory 206. The processor 208 is further configured to verify and establish trust in certificates received via the broadcast signal, as described in detail below.

It will be understood that the receiver 200 will in practice have many other components, which are not central to the present disclosure and have therefore been omitted in the interest of clarity of presentation and conciseness. Such components will vary depending on the specific type of receiver (TV, radio, hybrid including integrated network connection, set top box, TV set, etc.) but may include a display generator; a display; a second display or other auxiliary device; a network module for accessing such a "second screen" device, for example a table computer or mobile phone, via, for example, Bluetooth or Wi-Fi; user input processing circuitry, a user input device such as a remote control or keyboard; further detailed, separate and interacting processing components such as a dedicated video processor, dedicated security and/or conditional access module; and so forth. It will generally be understood that the components described above with reference to FIG. 5 (as well as FIGS. 3 and 4) are described as functional/logical groupings and that in practice they may be implemented in various structures, hardware, firmware and software, combined together or split between different physical processing units, processors and/or devices.

In some embodiments, when the receiver 200 is acquired by the user, there are no certificates or cryptographic keys preloaded in the receiver at manufacturing or retail stage that can be used to authenticate the application data received by the user device. The receiver 200, once connected to a broadcast network builds its own trust in received data. As will be described in detail below, in some embodiments this is done by acquiring certificates broadcast, for example over-the-air, and storing them in the receiver 200. There may be many channels/services or bundles of channels/services or one per country, depending on specific broadcast network configuration, so that the receiver 200 typically cannot globally rely on an external certification authority. The receiver 200 will, in some embodiments, trust a certificate when the same certificate is user over a predefined period of time, or if a newly introduced certificate is signed with the previous one, as set out in detail below.

Figure 6:
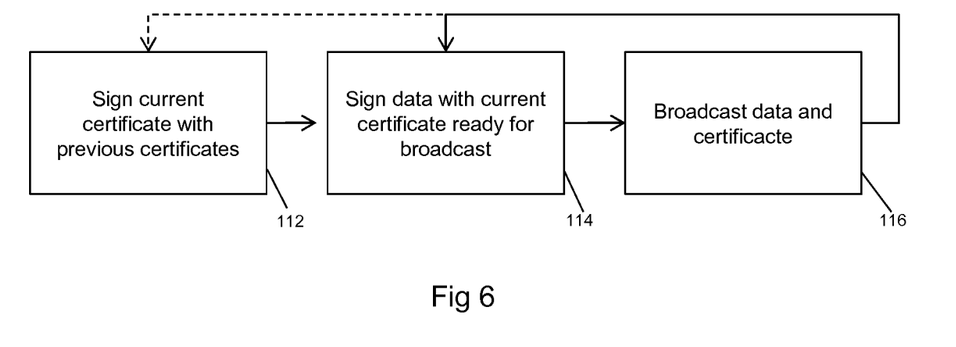
FIG. 6 illustrates a digital signing process implemented by the broadcaster.

Turning now to some processes implemented by the components described above, and beginning with head end (or upstream) processes at the broadcaster 100 side, a process for preparing data for broadcast so that it can be authenticated by the receiver 200 is now described with reference to FIG. 6. At step 112, a current certificate (that is a certificate with a public key to be used for verifying broadcast data at the receiver) is signed itself with one or more private keys associated with previous certificates (that is keys which have been used by the broadcaster 100—the channel, program, service, etc.—in the past to sign transmitted data while a respective previous certificate was in use) to enable the transfer of trust from previous to current certificates by the receiver 200 as described in detail below. In embodiments where the current certificate is signed with two or more private keys associated with respective previous certificates, this advantageously allows the receiver 200 to transfer trust from an older previous certificate to the current certificate if an intermediate certificate was missed, for example when the receiver 200 was switched off for some time. In some such embodiments, the current certificate is signed separately with each of these private keys (say, for example the private keys associated with the last six previous certificates) to create a corresponding number of respective signatures that are used to issue the current certificate (be included in the current certificate).

At step 114, the private key associated with the current certificate is used to sign data to be broadcast, so that it then is ready for broadcast. The data is then broadcast at step 116. The process may then loop back to step 114 to prepare further data for broadcasting using the private key associated with the current certificate, or to step 112 to change the private key and certificate periodically, for example once a month, at which point the current certificate becomes a previous certificate as the term is used herein and a new current certificate is used to verify the broadcast data. This helps to prevent a man-in-the-middle attack even if the pirate 400 can modify the signal over a long period of time, since the pirate 400 may not be able to sign a pirate certificate using the private key of a previous valid certificate, unless the pirate has somehow gained access to such a private key.

It will be understood that, in particular, the order of steps 112 and 114 can be reversed, although it will be typically efficient to issue a current certificate only once, while it can be used to sign many instances of data during its course of validity. It will further be understood that step 112, 114 and 116, and in particular steps 114 and 116, may be carried out by different entities co-operating to transmit data that can be authenticated. With respect to step 116, it will be understood that while, in some embodiments, the data may always be transmitted together with the certificate associated with its digital signature, this is not necessarily so and, in some embodiments, the current certificate may only be broadcast once or a few times after a change of certificate or may, more generally, be broadcast periodically independent of the data that has been signed.

Figure 7:
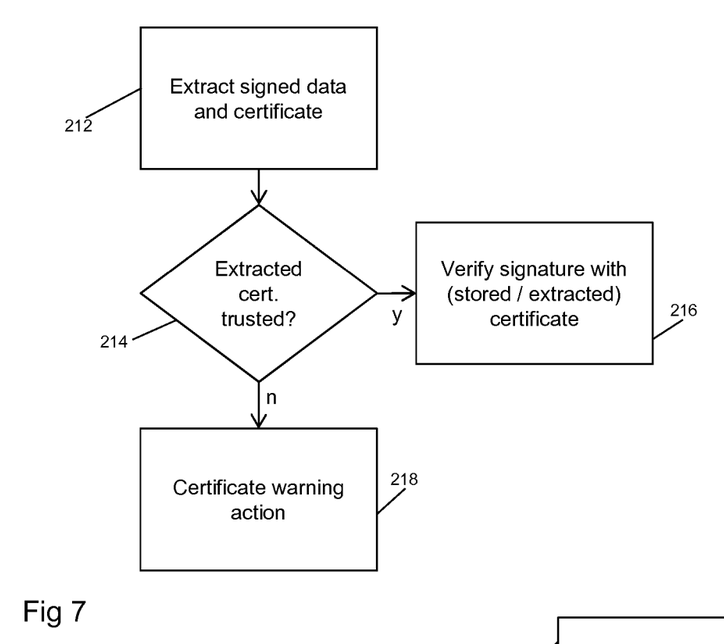
FIG. 7 illustrates an overview of a signature verification process implemented by the receiver.

With reference to FIG. 7, an overall process for authentication of received data by the receiver 200 is now described. At step 212, digitally signed data and the corresponding certificate are extracted from a broadcast signal. As described above, this may be done at the same time for both the data and certificate, or the two may be extracted independently, as described above in connection with the preparation and transmission of signed data by the broadcaster. However, it can be noted that extraction of data and certificate at step 212 may be decoupled, even if the two are always broadcast together. At step 214, the receiver 200 verifies whether the extracted certificate is trusted and, if so, uses the certificate to verify the signature of the data with the certificate, extracted or stored, as the case may be, at step 216. If the result of the verification is positive, access to the data (for example by displaying the data or using it to access and/or load an application) is granted, otherwise access may be refused and/or an authentication failure warning generated, for example for display. If the extracted certificate is not trusted a certificate warning action is triggered at step 218, as described further below.

Figure 8:
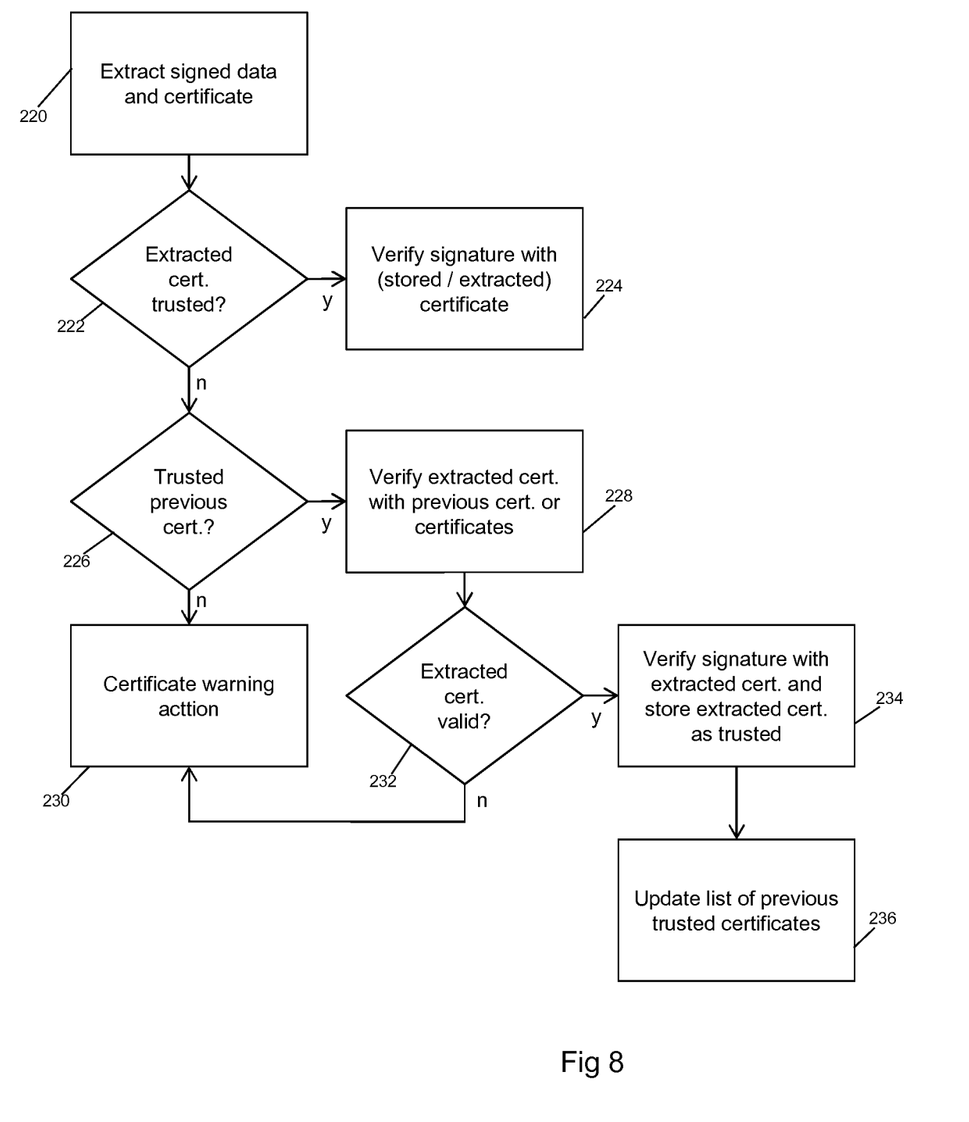
FIG. 8 illustrates a signature verification process with synchronous certificate verification.

A process for extracting and verifying a certificate at substantially the same time as the associated data is now described with reference to FIG. 8. At step 220, the signed data and a corresponding signature are extracted from the broadcast signal. At step 222 it is determined If the extracted certificate is has been previously trusted (for example it matches a certificate previously stored as trusted or is otherwise identified, for example by means of an identification code), and, if so, the certificate is used at step 224 to verify the signature of the data so as to authenticate the data as described above. If the determination is negative, then it is determined, at step 226 if a previous version of the certificate has been trusted (for example previously stored as trusted by the receiver 200, such as being present in a list of previously stored certificates). If so, the extracted certificate is verified at step 228 with one or more previous certificates, otherwise a certificate warning action is triggered at step 230.

Turning in more detail to step 228, the signature (or signatures) generated by the broadcaster 100 when issuing the current certificate (and received together with the certificate/attached to it) are examined by the receiver 200 by attempting to verify each signature with the previous one or more certificates for the same issuer stored as previously trusted and/or in a list of previously trusted certificates maintained by the receiver 200, in some embodiments starting with the most recent previous certificate. If one of these previous certificates verifies one of the signatures of the extracted current certificate (i.e. the public key associated with at least one of the previous certificates correctly verifies one of the signatures), the extracted certificate is considered to be valid.

If, at step 232 the extracted certificate has been determined to be valid, the signature of the data is verified as described above with reference to, for example, step 216, and the current certificate is stored as trusted at step 234. In embodiments maintaining a list of previously trusted previous certificates, the list is updated at step 236 with the now previous certificate added to the list (having now been replaced by the current certificate). Otherwise, if the determination at step 232 is negative, the process returns to step 230 to trigger a certificate warning action.

A certificate warning action, such as triggered at step 216 or 230, comprises, according to the embodiment and user interface design, one or more of the following:

generating a signal to cause display of a warning message, sending such a signal over a network and/or displaying the warning message;
    in the case of data for launching an application, blocking access to or launch of the application;
    in the case of data for use by an application, blocking access to the data;
    in case of content to be displayed together with, for example, an audio/video stream, blocking display of the content;
    If the receiver 200 is in a set-up mode, mark or store the certificate as trusted—a set-up mode may be active if, for example,
        the certificate is the first instance of a certificate extracted for the issuer of the certificate;
        the receiver 200 has been booted for the first time;
        the certificate is the first certificate, for the issuer or overall, received after a re-boot;
        a first or re-boot occurred within a predetermined period before the certificate was extracted;
        the receiver 200 or, specifically, its certificate management function has been manually reset by a user or otherwise.

Figure 9:
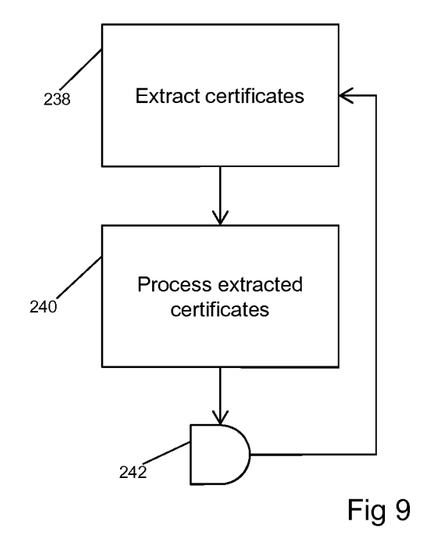
FIG. 9 illustrates an asynchronous certificate verification process.

With reference to FIG. 9, an asynchronous process for verifying certificates that may run independently of extraction of signed data is now described. Such a process may run periodically and maintains a store or list of a trusted current certificate and of previously trusted previous certificates, so that the verification at step 214, above can be simplified to a test whether the extracted certificate has been stored or marked as trusted previously by the receiver 200. Of course, this process can be combined with the process just described with reference to FIG. 8. Specifically, at step 238, certificates are extracted from the broadcast signal and each extracted certificate is processed at step 240 to verify the trust in it. It will be understood that in some embodiments a certificate is extracted and processed before the next one is processed and extracted, in effect interleaving steps 238 and 240. The process waits for a period of time at step 242 and then a further round of processing occurs. In this way, certificates are extracted and processed periodically, for example once a day. It will be understood that various schedules are possible, for example staggering extraction and processing by issuers, maintaining a list of issuers for which certificates are to be extracted (for example so that certificates are only extracted for issuers for which data/certificates were already requested, for example where a user demand triggered step 220 and following steps in the past), and so forth.

Figure 10:
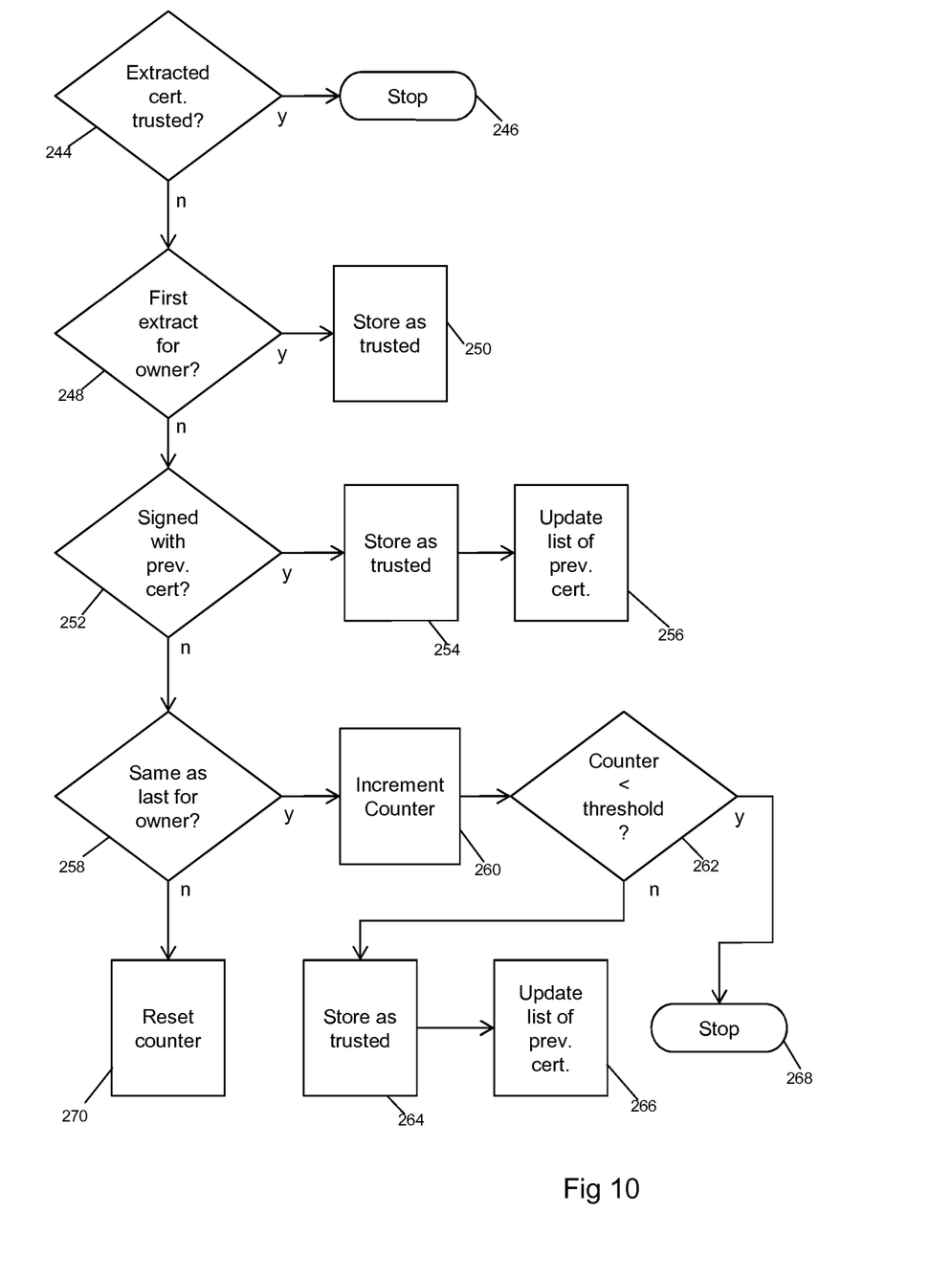
FIG. 10 illustrates details of the processing of certificates in FIG. 9.

The processing at step 240 of a given one of the extracted certificates may comprise one or more, according to the embodiment, of the steps of the process now described with reference to FIG. 10, where it will be noted in particular that the order and combination of steps may vary from embodiment to embodiment. At step 244 it is determined whether the extracted certificate is trusted, as described above, and if so processing of that certificate stops at step 246 and the process returns to process the next certificate. If the extraction is the first time that a certificate has been extracted for the issuer, as determined a step 248, for example by cross-reference with a list of issuers for which at least one certificate has been extracted in the past, then the extracted certificate is stored as trusted at step 250 and the process returns for the next certificate to be processed and/or extracted. Otherwise, at step 252, it is determined if the extracted certificate has been signed by the broadcaster 100 with a previous certificate from the same issuer (as described above, for example). If the determination is positive, the extracted certificate is stored as trusted at step 254 and a list of previously trusted certificates for the issuer is updated accordingly at step 256, as described above, and the process returns for the next certificate to be processes and/or extracted.

If the determination at step 252 is also negative, step 258 tests if the certificate is the same as that last extracted for the same issuer (for example by checking against a list holding for each issuer the last extracted certificate) and if so increments an extraction counter maintained for the extracted certificate at 260 (it being understood that if an issuer issues several certificates, for example for different services or channels, this step may be amended to check the last extraction of a certificated from the same issuer for, for example, the same service or channel). Step 262 checks if the counter meets a threshold condition and if so stores the extracted certificate as trusted at step 264 and updates a list of previous certificates at step 266, for example as described above, and the process returns for the next certificate to be processed and/or extracted. Otherwise, if the threshold conditions is not met, processing stops for this certificate at step 268 and the process returns to process the next extracted certificate (or to extract the next certificate for processing, in accordance with the specific embodiment). If the determination at step 258 is negative (i.e. there has been a change in the certificate for the issuer/a new certificate has been issued by the issuer), the extraction counter is reset at step 270 and the process returns for the next certificate to be processed and/or extracted.

Figure 11:
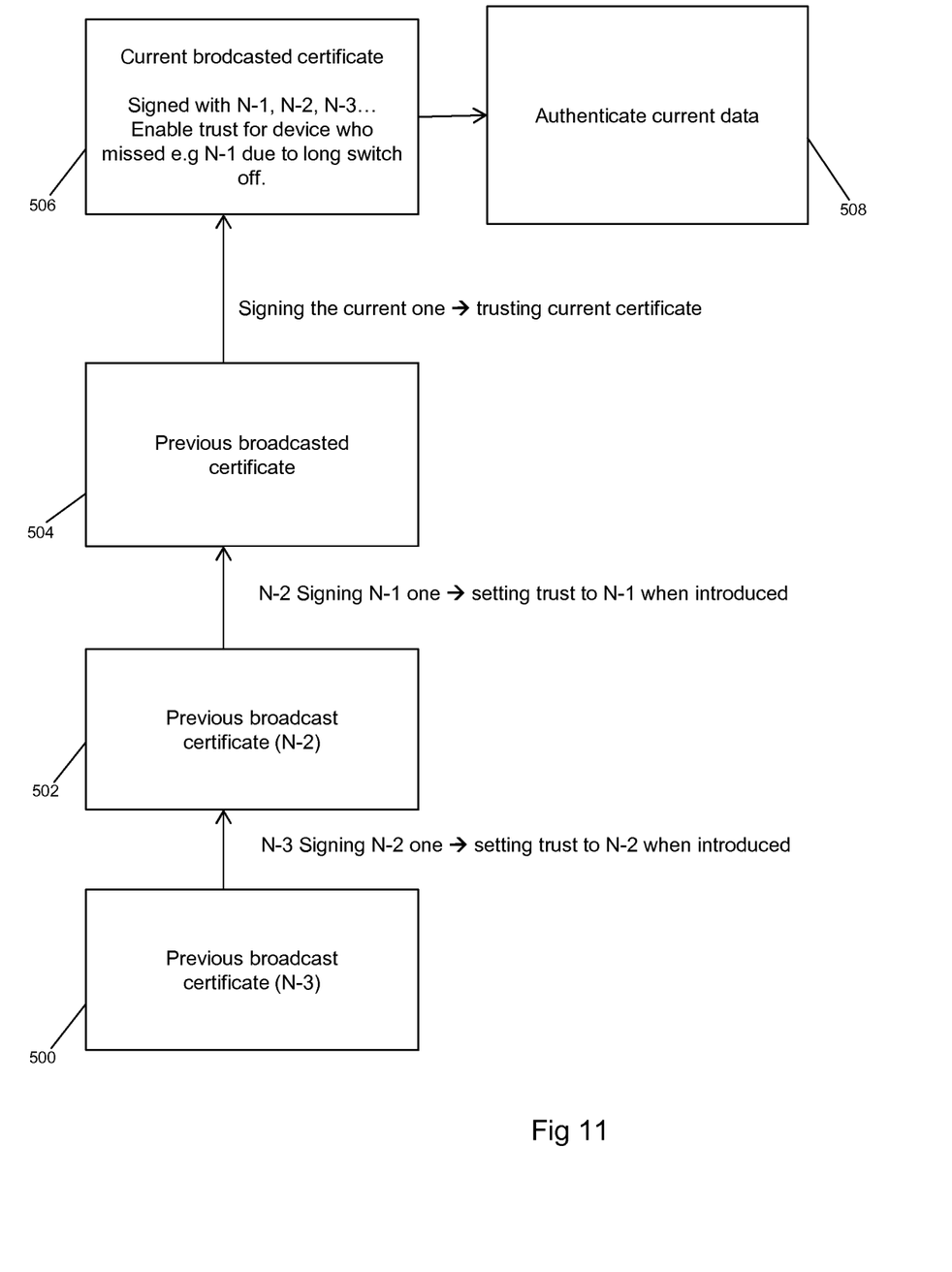
FIG. 11 illustrates operation of the described processes as a certificate changes several times over time.

Operation of the system and processes is now described, with reference to FIG. 11, at a high level taking as an example a certificate for a given issuer that changes periodically, such as when the issuer uses a new private key and correspondingly issues a new certificate, for example once a month. At a first step 500, in the past, a previous certificate N-3 was trusted and used to verify data signed with a corresponding private key. Certificate N-3 was thus included in a list of previously trusted certificates. At step 502 a new certificate N-2 has been introduced and is used for signing data. Trust has been transferred from certificate N-3 to certificate N-2 and certificate N-2 is added to the list of previously trusted certificates. At step 504, a new certificate N-1 is introduced, trust to it is transferred from certificate N-2 (or N-3) and certificate N-1 is added to the list. At step 506, a current certificate N has been received. The current certificate is signed by the broadcaster 100 with certificates N-1, N-2 and N-3, so that the receiver 200 can trust the current certificate on the basis of any of these previous certificates as described above and use the current certificate to authenticate current data at step 508. A receiver 200 that has missed certificate N-1, say, due to for example a long switch off, can still transfer trust from an older certificate (N-2 or N-3) and so use the current certificate for authentication.

It will be appreciated that the number of previous certificates to be maintained in the list will be determined by a number of design factors, including a trade-off between the length that a device may be switched off without having to go through a set-up procedure to establish trust in certificates from a given issuer, length of certificate lists and signature data and the risk of attack if old certificates become compromised. The number previous certificates that are used for signature of a current certificate/transfer of trust can, for example, be set to 2, 3, 4, 5, 6, or higher. Likewise, it will be appreciated that the point in time at which a current certificate is added to the list of previous certificates may vary from embodiment to embodiment. For example, in some embodiments, a currently trusted certificate is added to the list of previously trusted previous certificates as soon as it has been verified an is trusted, so that it is ready in that list to verify a new certificate that is received in the future. In some embodiments, the current certificate may be added to this list only once a new certificate becomes the current certificate (In which case the current certificate, N in the example above, is verified by certificates N-2 or N-3, pending addition of certificate N-1 to the list). It will be appreciated that intermediate and alternative timings are of course also possible in various embodiments.

Various modifications, combinations and juxtapositions of the features described above that are within the scope of the appended claims will occur to a person skilled in the art. It will be understood that while the described embodiments are disclosed in different groupings and modules, some embodiments mirror the described groupings in terms of physical implementation, possibly with the implementation in dedicated hardware of some or all of the groupings and modules, while other embodiments regroup the described functionalities in different physical arrangements and the described modules and groupings are to be understood as logical groupings for the purpose of clarity of explanation of the associated functions, rather than for the purpose of limitation. Thus the described functions can be grouped differently in logical or physical groupings and can be implemented in one or more of software, firmware, middleware or hardware according to various embodiments. Likewise, it will be understood that the described process steps can be rearranged, combined or omitted to some extent and that such changes will be apparent to the skilled person reading the above description. It will be understood that the above description has been made for the purpose of explanation of various embodiments and the disclosed techniques and not for the purpose of limitation of the scope of the appended claims.

The invention claimed is:

1. A system comprising:
a receiver configured to receive a digital signal; and
a processor configured to:
verify a current digital certificate extracted from the digital signal using a previous digital certificate previously stored as trusted, the current digital certificate being signed with one or more private keys associated with respective previous digital certificates issued by an issuer of the current certificate,
wherein the current digital certificate and previous digital certificate are associated with digital signatures with which data transmitted with the digital signal has been signed, and the current digital certificate is signed with plural private keys corresponding to the respective previous digital certificates.

2. The system of claim 1, wherein the processor is further configured to:
extract the current digital certificate from the digital signal;
make a first determination of whether the extracted digital certificate has previously been stored as trusted;
in response to the first determination being negative, make a second determination of whether a previous digital certificate of the respective previous digital certificates issued by the issuer has been stored and trusted;
in response to the second determination being positive, use the stored as trusted previous digital certificate of the respective previous digital certificates to make a third determination of whether the extracted certificate is valid by verifying the extracted digital certificate using a respective public key associated with the stored as trusted previous digital certificate of the respective previous digital certificates; and
in response to the third determination being positive, store the extracted digital certificate as trusted.

3. The system of claim 2, wherein the processor is further configured to:
extract the data from the digital signal, wherein the data is signed with a digital signature using a private key of the one or more private keys and the current digital certificate is associated with the respective private key and with a public key for verifying the digital signature;
in response to the first determination being positive, use the public key associated with the extracted digital certificate to verify the digital signature of the data; and,
in response to the third determination being positive, use the public key associated with the extracted digital certificate to verify the digital signature of the data.

4. The system of claim 3, wherein the processor is further configured to make a positive fourth determination in response to a public key associated with any one of the previous digital certificates that have been stored as trusted correctly verifies the current certificate.

5. The system of claim 3, wherein the processor is further configured to:
in response to the second determination being negative and no certificate issued by the issuer has been extracted by the system previously, store the extracted certificate as trusted.

6. The system according to claim 3, wherein the processor is configured to:
in response to the second determination being negative, generate a certificate warning signal.

7. The system according to claim 1, wherein the processor is further configured to:
periodically extract the current certificate from the digital signal and store the extracted certificate as trusted in response to the extracted certificate being extracted consistently for a predetermined number of times and/or a predetermined amount of time.

8. The system of claim 1, wherein the system implements an HbbTV interactive environment.

9. The system of claim 1, wherein the receiver comprises a television receiver.

10. The system of claim 1, wherein the processor is further configured to:
store a certificate issued by an issuer as a trusted if no certificate issued by the issuer has been previously received by the system.

11. A system for signing application date to be transmitted in conjunction with a digital certificate in a digital signal, the system comprising a processor configured to:
sign data to be transmitted with a digital signature using a private key owned by an issuer of the digital certificate, wherein the digital certificate is associated with the private key and with a public key for verifying the digital signature;
sign the digital certificate with a digital signature using plural previous private keys associated with respective previous certificates issued by the issuer of the digital certificate.

12. The system of claim 11, further comprising a transmitter configured to transmit the digital signal comprising the signed data and the digital certificate.

13. The system of claim 11, wherein the digital signal comprises a digital television signal.

14. The system of claim 11, wherein the digital certificate has been digitally signed with a plurality of private keys associated with respective previous certificates, such that the digital signature can be verified with any one of a plurality of respective public keys associated with the respective previous certificates.

15. The system of claim 11, wherein the data comprises application data for use by an application.

16. The system of claim 11, wherein the application data comprises a URL or contact information for use by the application or to launch the application.

17. The system of claim 11, wherein the data is in the form of a Digital Video Broadcast (DVB) table.

18. The system of claim 11, wherein the data is in the form of a DVB Application Information Table (AIT) table.

19. The system of claim 17, wherein the data comprises signaling data.

20. The system of claim 11, wherein the data comprises at least one of audio data, video data, subtitles, screen overlay data, and content related to received audio and video data.

21. A method using a receiver configured to receive a digital signal, the method comprising:
verifying a current digital certificate extracted from the digital signal using a previous digital certificate previously stored as trusted, the current digital certificate being signed with one or more private keys associated with respective previous digital certificates issued by an issuer of the current certificate, wherein the current digital certificate and previous digital certificate are associated with digital signatures with which data transmitted with the digital signal has been signed, and the current digital certificate is signed with plural private keys corresponding to the respective previous digital certificates.

22. A method of signing application data to be in conjunction with a digital certificate in a digital signal, the method comprising:

signing data to be transmitted with a digital signature using a private key owned by an issuer of the digital certificate, wherein the digital certificate is associated with the private key and with a public key for verifying the digital signature;

signing the digital certificate with a digital signature using plural previous private keys associated with respective previous certificates issued by the issuer of the digital certificate.

* * * * *